United States Patent Office 3,326,925
Patented June 20, 1967

3,326,925
GUANIDINO-ALKYL-AZA-SPIROALKANES
Don Pierre René Lucien Giudicelli, Fontenay-sous-Bois, and Henry Najer, Paris, France, assignors to Les Laboratoires Dausse, Paris, France, a company of France
No Drawing. Filed May 26, 1964, Ser. No. 370,343
Claims priority, application France, May 27, 1963, 936,120; May 30, 1963, 936,591
13 Claims. (Cl. 260—293)

This invention relates to spiroalkane derivatives.
The invention provides guanidino-alkyl-aza-spiroalkanes of the formula:

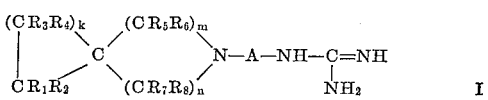
                                                   I in which $k$ is an integer from 1 to 7, $m$ is an integer from 0 to 3, and $n$ is an integer from 1 to 4, the sum of $k$, $m$, and $n$ being at least 3 and at most 8, $R_1$, $R_2$, $R_3$, $R_4$, $R_5$, $R_6$, $R_7$ and $R_8$ are each hydrogen or lower alkyl, the total number of carbon atoms in the said R radicals not exceeding 6, and A is a straight or branched alkylene radical containing 1 to 6 carbon atoms, and the acid addition salts and quaternary ammonium derivatives thereof.

The alkylene radical A in formula I is ordinarily ethylene, 1,2-propylene, 1,3-propylene, 1,3-butylene, 2,3-butylene, 1,4-butylene, 1,5-pentylene, or 1,6-hexylene, especially ethylene.

These compounds have a rapid and lasting hypotensive effect, and can be satisfactorily tolerated. They are thus useful in the treatment of hypertension.

The hypotensive activity of the compounds of the invention is greater as the total number of atoms of the aza-spiro ring is nearer to 8 and as the sum $(m+n)$ is nearer to 4. Thus compounds in which the aza-spiroalkane nucleus contains 6–8 carbon atoms are preferred.

Administered intravenously to a chloralosed dog in doses between 0.002 and 0.015 g./kg., the compounds of the invention cause:

(a) Slow liberation of pyrocatechol amines from their depots in the organism;

(b) More or less complete or more or less prolonged inhibition of the reflex hypertension following occlusion of the carotids;

(c) Diminution or suppression, for a period of time, of the hypertension following the excitation of the central end of the vagus nerve;

(d) More or less intense reinforcement of the hypertension induced by adrenalin or noradrenalin when these hormones are injected intravenously;

(e) Decrease in arterial blood pressure without ganglionic blockage: the rapidity, progressiveness, intensity, and duration (several hours to several days) of this effect varies with the derivative.

On the other hand, when administered intravenously to an awakened cat in a dose of 0.010 g./kg., the new compounds cause a relaxation of the nictitating membrane, of which the rapidity, intensity and duration vary from one compound to the other, the duration being in some cases as much as 100 hours or even more.

In a cat which has received intravenously 0.002 to 0.015 g./kg. of one of the new compounds, the contraction of the nictitating membrane, following the postganglionic excitation of the cervical sympathetic nervous system, is sometimes inhibited and sometimes completely suppressed, according to the nature of the compound administered. On the other hand, the sensitivity of the nictitating membrane to the intravenous injection of adrenalin or noradrenalin is greatly increased, the contraction produced by these two pyrocatechol amines being much more intense after, than before, administration of the new compounds.

The compounds which are of greatest interest for therapeutic purposes include the following:

N-($\beta$-guanidinoethyl)-6-azaspiro-[2.5]-octane,
N-($\beta$-guanidinoethyl)-6-azaspiro-[3.4]-octane,
N-($\beta$-guanidinoethyl)-7-azaspiro-[3.5]-nonane,
N-($\beta$-guanidinoethyl)-2-azaspiro-[4.4]-nonane,
N-($\beta$-guanidinoethyl)-8-azaspiro-[4.5]-decane,
N-($\beta$-guanidinoethyl)-2-azaspiro-[4.5]-decane,
N-($\beta$-guanidinoethyl)-3-azaspiro-[5.5]-decane, and their acid addition salts.

Thus, the neutral sulphate of N-($\beta$-guanidinoethyl)-6-azaspiro-[2.5]-octane, the method of preparation of which forms the subject of Example 1(e) below, has an anti-hypertensive activity which is 1.5 to 2 times that of guanethidine. Moreover, its $LD_{50}$, determined according to the method of Kaërber & Behrens, after intravenous administration to the white mouse, is 46 mg./kg. whereas that of guanethidine, according to the literature, is 23±0.4 mg./kg. when administered intravenously in the rat.

The substantially normal behaviour of the cats which have received intravenously 10 mg./kg. of this compound (the dose being expressed as the base) contrasts with that of animals of the same species treated with an identical dose (expressed as base) of guanethidine. The latter remain prostrate, sleepy and anorexic during the 2 to 3 days following the injection.

The various effects described above are shown by the neutral sulphate of N-($\beta$-guanidinoethyl)-6-azaspiro-[2.5]-octane, when administered to the dog or cat under the influence of chloralose. These effects are rapid, durable and more intense than those shown by guanethidine.

In accordance with a feature of the invention the compounds of formula I are made by reacting together compounds of the formulae:

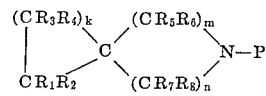

and Q—$NH_2$, P and Q being such that they will interact in known manner to produce a divalent radical of the formula:

$$-A-NH-C(:NH)-$$

Preferably P is —A—$NH_2$ and Q is R—S—C(:NH)—, R—O—C(:NH)—, or NC— (where R is an alkyl group). That is to say, an N-($\omega$-aminoalkyl)-aza-spiroalkane is reacted with an S-alkyl-isothiourea, an alkyl isourea, or cyanamide.

It is especially advantageous to react the N-($\omega$-aminoalkyl)-aza-spiroalkane with S-methyl-isothiourea sulphate in an inert solvent, the molar ratio being ordinarily 2:1. Conveniently the solvent is water or an alcohol, and the reaction is continued for several hours at reflux temperature in a stream of nitrogen. The N-($\omega$-guanidinoalkyl)-aza-spiroalkane sulphate is thus obtained, from which the base can be extracted after basification. The base may easily be transformed into any pharmaceutically acceptable organic or mineral acid salt or, by addition of an alkylating agent, into a quaternary ammonium derivative.

The N-($\omega$-aminoalkyl)-aza-spiroalkanes used as starting materials can be prepared by reduction in an inert solvent, for example ether or tetrahydrofuran, or a corresponding N-($\omega$-cyanoalkyl)-aza-spiroalkane (in which the cyanoalkyl group is —A'—CN, where A' is such that —A'—$CH_2$— is the same as A), using an appropriate reducing agent, such as lithium-aluminium hydride.

The N-($\omega$-cyanoalkyl)-aza-spiroalkanes are themselves obtained by heating for several hours at reflux temperature equimolar quantities of a corresponding unsubstituted aza-spiroalkane and an ω-halogenoalkyl nitrile in an aromatic hydrocarbon, for example benzene, in the presence of an alkali, such as potassium carbonate, to bind the hydrogen halide formed.

The unsubstituted aza-spiroalkanes are obtained by reduction of the corresponding cyclic imides, e.g. the 3,3-polymethylene-spiro-azetidine-2,4-diones, 3,3-polymethylene-spiro-pyrrolidone-2,5-diones, and 3,3-polymethylene-spiro-piperidine-2,6-diones. Among the latter 3,3-dimethylenespiro-piperidine-2,6-dione (or 6-aza-spiro-[2,5]-octane-5,7-dione) is obtained by pyrolysis at 250°–300° C. of the ammonium salt of cyclopropane-1,1-diacetic acid.

The process of the invention may alternatively be carried out by reacting a compound in which P is —H with a compound in which Q is Hal—A—NH—C(:NH)— or Hal—A'—CO—NH—C(:NH)—, where Hal is halogen, for example by causing an ω-halogenoalkyl guanidine to react with an aza-spiroalkane, or by causing an ω-halogenoacyl guanidine to react with a aza-spiroalkane, followed by reduction of the —CO— grouping of the acylated derivative obtained to a —CH$_2$— grouping, using an appropriate reducing agent, for example lithium-aluminium hydride.

The invention includes within its scope pharmaceutical compositions comprising at least one compound of the invention in association with a compatible, pharmaceutically acceptable diluent. Such compositions are more especially used in the treatment of arterial hypertension. When the active ingredient is in the form of a salt, this salt will be one derived from an acid acceptable from a pharmaceutical point of view.

The compositions are preferably in the form of tablets, dragees, or capsules, for oral administration, and may contain the new compounds alone or in association with other therapeutic agents. The following are examples of compositions within the scope of the invention.

(1) Simple composition (amounts for one tablet):

|  | G. |
|---|---|
| Salt of N-(ω-guanidinoalkyl)-aza-spiroalkane (expressed as the base) | 0.0005 to 0.100 |
| Excipient. | |

(2) Compound compositions containing, in addition, reserpine or other alkaloid of *Rauwolfia serpentina* (amounts for one tablet):

|  | G. |
|---|---|
| (a) Salt of N-(ω-guanidinoalkyl)-azaspiroalkane (expressed as the base) | 0.0005 to 0.100 |
| Reserpine (as the hydrochloride) | 0.00002 to 0.0002 |
| Excipient. | |
| (b) Salt of N-(ω-guanidinoalkyl)-azaspiroalkane (expressed as the base) | 0.0005 to 0.100 |
| Reserpine (as the hydrochloride) | 0.0001 |
| Rescinnamine | 0.00025 |
| Raupine | 0.00001 |
| Ajmaline | 0.00019 |
| Methyl yohimbate | 0.0006 |
| Excipient. | |

(3) Compound compositions comprising a salidiuretic, e.g. of the benzthiadiazine series, and especially the 1,1-dioxide of parafluorophenyl-3-methyl-7-sulphamyl-6-chloro-3,4-dihydro-1,2,4-benzthiadiazine (amounts for one tablet):

|  | G. |
|---|---|
| Salt of N-(ω-guanidinoalkyl) azaspiroalkane (expressed as base) | 0.0005 to 0.100 |
| 1,1-dioxide of para-fluorophenyl-3-methyl-7-sulphamyl-6-chloro-3,4 - dihydro-1,2,4-benzthiadiazine | 0.001 to 0.030 |
| Potassium chloride | 0.300 |
| Excipient. | |

The following example and the data in the table illustrate the invention.

EXAMPLE

*Preparation of N-(β-guanidinoethyl)-6-azaspiro-[2,5]-octane*

(a) *6-azaspiro-[2,5]-octane-5,7-dione.*—In a spherical Claisen flask with a capacity of 100 cc., equipped with a sealed-in capillary tube and a coil-type condenser and double jacket, there is placed 31.6 g. (0.2 mol/g.) of cyclopropane-1,1-diacetic acid in suspension in 30 cc. of water. Ammonia is bubbled through the capillary tube until complete dissolution has occurred. The flask, the contents of which are kept under a stream of ammonia, is then introduced into a metal bath preheated to 90° C. and heating is continued for 30 minutes at 115° to 125° C. until the water has completely evaporated. The temperature of the bath is then brought to 250° to 260° C., and this temperature is maintained for 35 minutes. After 20 minutes, the ammonium salt melts, and then dehydrates. The contents of the flask are allowed to cool, and are then dissolved in 250 cc. of boiling ethyl acetate. The solution is filtered through "Norit," cooled in ice, and filtered. The residue is washed with ethyl acetate and dried in vacuo. 9.9 g. (yield=35.6%) of 6-azaspiro-[2.5]-octane-5,7-dione are obtained, soluble in alcohols and sparingly soluble in ether, melting point=165° C.

*Analysis.*—C$_7$H$_9$NO$_2$; (M.W.=139). Calculated, percent: C, 60.43; H, 6.47; N, 10.07. Found, percent: C, 60.56, 60.71; H, 6.41, 6.46; N, 9.96, 9.99.

(b) *6-azaspiro-[2.5]-octane.*—Into a 1-litre spherical flask having 2 tubulures, equipped with a mechanical stirrer and a Soxhlet extractor containing 35.7 g. (0.257 mol/g.) of 6-azaspiro-[2,5] - octane - 5,7 - dione, above which is condenser equipped with a calcium chloride trap, are introduced 19.5 g. (0.51 mol/g.) of lithium-aluminium hydride in 500 cc. of anhydrous ether. While the ether is refluxed for 8 hours the dione is progressively brought into contact with the reducing agent. The reduction is terminated by heating under reflux for 5½ hours, the mixture is then cooled to 0° C., and hydrolysed by successively adding 20 cc. of water, 15 cc. of 15% sodium hydroxide and 70 cc. of water. The mineral salts are filtered off and washed three times with ether. The ethereal solution is dried overnight over potassium carbonate and filtered, the ether is driven off, and the liquid residue is distilled in vacuo. 18.5 g. (yield=65%) of 6-azaspiro-[2.5]-octane, distilling at 59° to 60° C./4 mm., are obtained as a colourless liquid soluble in the alcohols, benzene, and ether, and forming a carbonate very rapidly in air; $n_D^{23.2°}$=1.4672.

*Analysis.*—C$_7$H$_{13}$N; (M.W.=111). Calculated, percent: C, 75.68; H, 11.71. Found, percent: C, 73.30, 73.35; H, 12.25, 12.15.

(The too low results with carbon and too high results with hydrogen are due to the avidity of the compound for carbon dioxide and the humidity of the air.) The picrate of the base, recrystallised from alcohol, melts at 195° C.

(c) *N-cyanomethyl-6-azaspiro-[2,5] - octane.*—In a 1-litre flask having 3 tubulures, equipped with a dropping funnel, a mechanical stirrer and a condenser, are introduced 14.5 g. (0.192 mol/g.) of chloracetonitrile, 10.2 g. (0.095 mol/g.) of sodium carbonate and 250 cc. of benzene. By the dropping funnel, a solution of 17.8 g. (0.16 mol/g.) of 6-azaspiro-[2,5]-octane in 100 cc. of benzene is slowly poured in, 0.5 cc. of water is then added, and the mixture is heated for 5 hours under reflux with stirring. The mineral salts are centrifuged off, washed twice with benzene, and the benzene solution is dried overnight over sodium sulphate and filtered. The benzene is driven off on a water bath, and the residue is then distilled in vacuo. 21 g. (yield=87.5%) of N-cyanomethyl-6-azaspiro-[2.5]-octane are recovered as a colourless liquid, distilling at 83° C./1–2 mm., and soluble in the conventional organic solvents; $n_D^{19.4°}$=1.4805.

*Analysis.*—C$_9$H$_{14}$N$_2$; (M.W.=150). Calculated, percent: C, 72.00; H, 9.33. Found, percent: C, 71.41, 71.36; H, 9.44, 9.39.

(d) *N-(β-aminoethyl)-6-azaspiro-[2.5] - octane.*—Into a 2-litre spherical flask having 3 tubulures, equipped with a dropping funnel, a condenser surmounted by a calcium chloride trap and a mechanical stirrer, a suspension of 5.3 g. (0.138 mol/g.) of lithium-aluminium hydride in 500 cc. of anhydrous ether is introduced, and the contents of the flask are cooled by a bath of ice and salt to below 0° C. A solution of 20.8 g. (0.138 mol/g.) of N-cyanomethyl-6-azaspiro-[2.5]-octane in 100 cc. of anhydrous ether is slowly poured in through the dropping funnel, while the mixture is stirred, the speed of addition being regulated so as to keep the temperature of the mixture below 0° C. The duration of the addition is 15 minutes. The mixture is left for 2 hours with stirring in the ice bath, and then for 1 hour at ambient temperature, the contents of the flask are then again cooled to below 0° C., and hydrolysed by the successive addition of 7 cc. of water, 4 cc. of 20% sodium hydroxide and 22 cc. of water. The mineral salts are centrifuged off, carefully washed three times with ether and then three times with tetrahydrofuran. The ether tetrahydrofuran solution is dried for a few hours over potassium carbonate and filtered. The solvents are driven off and the residue is distilled in vacuo. 18.2 g. (yield=88.5%) of N(β-aminoethyl)-6-azaspiro-[2.5]-octane are obtained as a colourless liquid distilling at 62° C./1 mm., soluble in the conventional organic solvents; $n_D^{20.8°}=1.4842$.

*Analysis.*—$C_9H_{18}N_2$; (M.W.=154). Calculated, percent: C, 70.13; H, 11.69. Found, percent: C, 70.16, 70.01; H, 11.37, 11.17.

The dipicrate, recrystallised from water, melts at 243–244° C.

(e) *N-(β-guanidinoethyl)-6-azaspiro - [2.5] - octane.*—In a 1-litre spherical flask having 3 tubulures, equipped with a condenser and a mechanical stirrer a mixture of 10.5 g. (0.068 mol/g.) of N-(β-aminoethyl)-6-azaspiro-[2.5]-octane and 9.5 g. (0.034 mol/g.) of S-methylisothiourea sulphate in 50 cc. of water is refluxed for 1 hour, 40 minutes in a stream of nitrogen while stirring. The solution is evaporated to dryness, the solid residue is triturated in acetone, centrifuged and dried in vacuo. There are obtained 15.4 g. (yield=92.5%) of the neutral sulphate of N-(β-guanidinoethyl)-6-azaspiro - [2.5] - octane which, when recrystallized from 450 cc. of alcohol, is obtained as a white, crystalline compound soluble in water, M.P. 275–277° C., with decomposition.

*Analysis.*—$C_{20}H_{42}N_8O_4S$; (M.W.=490). Calculated, percent: C, 48.98; H, 8.57. Found, percent: C, 48.98, 49.14; H, 8.64, 8.56.

The dihydrobromide, recrystallised from isopropyl alcohol, melts at about 150° C. (indefinite).

Using the methods employed in this example, compounds of the invention are prepared in which $m$ is 2, the symbols $R_1$, $R_2$, $R_3$, $R_4$, $R_5$, $R_6$, $R_7$, and $R_8$ each represent hydrogen, and A represents the $(CH_2)_2$ group. These compounds, obtained as the sulphates, thus conform to the formula:

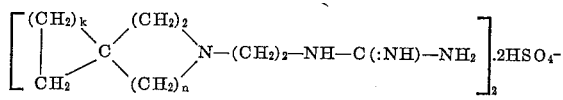

where $k$ is 1 to 4 and $n$ is 1 or 2.

The results obtained are set out in the following table, which also contains details of the intermediates.

| k | n | B.P., °C./mm. [M.P., ° C.] | $n_D^t$ | Yield, percent | Recrystallisation solvent | Percent C Found (calc.) | Percent H Found (calc.) |
|---|---|---|---|---|---|---|---|
| | | Final products | | | | | |
| 3 | 1 | [250 with decomposition] | | 69.5 | Methyl alcohol | 51.14 (50.97) | 8.97 (8.88) |
| 3 | 2 | [320 with decomposition] *ᵃ* | | 60 | 95% alcohol | 52.09 (52.75) | 9.19 (9.16) |
| 2 | 2 | [310–315 with decomposition] | | 76 | do | 50.56 (50.97) | 8.97 (8.88) |
| 4 | 2 | [335–340 with decomposition] *ᵇ* | | 98 | 90% alcohol | 54.92 (54.36) | 9.70 (9.41) |
| 2 | 1 | [237–238] *ᶜ* | | 88.5 | Alcohol | 48.82 (48.98) | 8.54 (8.57) |
| 4 | 1 | [260 with decomposition] | | 78 | Water | 52.36 (52.75) | 9.37 (9.16) |

Intermediates of formula

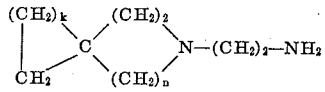

| 3 | 1 | 82–84/1 | $1.4868^{20.6}$ | 90 | | 70.15 (71.43)ᵈ | 12.14 (11.90) |
| 3 | 2 | 88–90/2 | $1.4952^{18}$ | 83.5 | | 72.68 (72.52) | 11.98 (12.09) |
| 2 | 2 | 74–75/1 | $1.4873^{24.6}$ | 92.5 | | 69.68 (71.43)ᵈ | 11.93 (11.90) |
| 4 | 2 | 103–106/1 | $1.4984^{22.3}$ | 82 | | 73.31 (73.47) | 12.45 (12.25) |
| 2 | 1 | 62/2 | $1.4840^{19}$ | 81.5 | | 69.78 (70.13) | 11.22 (11.69) |
| 4 | 1 | 84–86/1 | $1.4920^{20}$ | 86.5 | | 72.65 (72.52) | 12.00 (12.09) |

Intermediates of formula $$\begin{matrix}(CH_2)_k & (CH_2)_2 \\ & C & \\ CH_2 & (CH_2)_n\end{matrix}\!\!N\!\!-\!\!CH_2\!-\!CN$$

| k | n | B.P., °C./mm. [M.P., °C.] | $n_D{}^t$ | Yield, percent | Recrystallisation solvent | Percent C Found (calc.) | Percent H Found (calc.) |
|---|---|---|---|---|---|---|---|
| | | Final products | | | | | |
| 3 | 1 | 90–91/1 | $1.4815^{23.4}$ | 80 | | 72.82 (73.17) | 9.75 (9.76) |
| 3 | 2 | 106/2 | $1.4882^{20.6}$ | 88.5 | | 73.94 (74.16) | 8.99 (10.11) |
| 2 | 2 | 89/1 | $1.4801^{26.8}$ | 92.5 | | 72.75 (73.17) | 9.75 (9.76) |
| 4 | 2 | 124/1–2 [55] | | 86.5 | Acetone-water | 75.65 (75.00) | 10.38 (10.42) |
| 2 | 1 | 82–84/1–2 | $1.4766^{20}$ | 84 | | 71.55 (72.00) | 9.50 (9.33) |
| 4 | 1 | 100–101/1 | $1.4870^{20.4}$ | 85.5 | | 74.58 (74.16) | 10.25 (10.11) |

Intermediates of formula $$\begin{matrix}(CH_2)_k & (CH_2)_2 \\ & C & \\ CH_2 & (CH_2)_n\end{matrix}\!\!NH$$

| k | n | B.P., °C./mm. [M.P., °C.] | $n_D{}^t$ | Yield, percent | Recrystallisation solvent | Percent C Found (calc.) | Percent H Found (calc.) |
|---|---|---|---|---|---|---|---|
| 3 | 1 | 78–80/20 | $1.4808^{20.4}$ | 46 | | 74.97 d(76.80) | 11.95 (12.00) |
| 3 | 2 | 83–84/11–12 | $1.4870^{23}$ | 58 | | 76.48 d(77.70) | 12.22 (12.23) |
| 2 | 2 | 63–65/13 | $1.4781^{24.4}$ | 50.5 | | 75.20 d,76.80) | 11.92 (12.00) |
| 4 | 2 | 63–65/1 | $1.4932^{19.5}$ | 61 | | 76.08 d(78.43) | 12.12 (12.42) |
| 2 | 1 | 59–61/24–26 | $1.4750^{21.8}$ | 83 | | 74.54 d(75.78) | 11.53 (11.71) |
| 4 | 1 | 87–89/15 | $1.4871^{20}$ | 47 | | 76.74 d(77.70) | 12.24 (12.23) | a Its dihydrochloride melts at 218–219° C. (recrystallised from alcohol); percent Cl (calc.)=23.91; percent Cl (found)=23.72.
b Its dihydrochloride melts at 243–245° C. (recrystallised from alcohol); percent Cl (calc.)=22.83; percent Cl (found)=22.5.
c Its dihydrobromide, recrystallised from a mixture of methyl ethyl ketone and isopropyl alcohol (1:1) is hygroscopic; percent Br. calc.= 44.69; percent Br. found=44.77.
d The too low carbon content is due to the avidity of this amine for the carbon dioxide of the air.

We claim:

1. A compound of the formula:

$$\begin{matrix}(CH_3R_4)_k & (CR_5R_6)_m \\ & C & \\ CR_1R_2 & (CR_7R_8)_n\end{matrix}\!\!N\!\!-\!\!A\!\!-\!\!NH\!\!-\!\!\underset{\underset{NH_2}{|}}{C}\!\!=\!\!NH$$

in which $k$ is an integer from 1 to 7, $m$ is an integer from 0 to 3, and $n$ is an integer from 1 to 4, the sum of $k$, $m$, and $n$ being at least 3 and at most 8, each of $R_1$, $R_2$, $R_3$, $R_4$, $R_5$, $R_6$, $R_7$ and $R_8$ is selected from the class consisting of hydrogen and lower alkyl and the total number of carbon atoms in the said R radicals is at most 6, and A is an alkylene radical containing 1 to 6 carbon atoms, and the pharmaceutically acceptable acid addition salts and quaternary ammonium derivatives thereof.

2. A compound as claimed in claim 1 in which all the R radicals are hydrogen.

3. A compound as claimed in claim 1 in which A is selected from the class consisting of ethylene, 1,2-propylene, 1,3-propylene, 1,3-butylene, 2,3-butylene, 1,4-butylene, 1,5-pentylene, and 1,6-hexylene.

4. A compound as claimed in claim 1 in which the azaspiroalkane nucleus contains 6 to 8 carbon atoms.

5. A compound of the formula:

$$\begin{matrix}(CH_2)_k & (CH_2)_2 \\ & C & \\ CH_2 & (CH_2)_n\end{matrix}\!\!N\!\!-\!\!CH_2CH_2\!\!-\!\!NH\!\!-\!\!\underset{\underset{NH_2}{|}}{C}\!\!=\!\!NH$$

in which $k$ is 1 to 4, and $n$ is 1 to 2, and its acid addition salts.

6. A compound as claimed in claim 5, in which the sum of $k$ and $n$ is at most 4.

7. N-(β-guanidinoethyl)-6-azaspiro-[2.5]-octane and its pharmaceutically acceptable acid addition salts.

8. N-(β-guanidinoethyl)-8-azaspiro-[4.5] - decane and its pharmaceutically acceptable acid solution salts.

9. N-(β-guanidinoethyl)-7-azaspiro-[3.5] - nonane and its pharmaceutically acceptable acid addition salts.

10. N-(β-guanidinoethyl)-2-azaspiro-[4.4]-nonane and its pharmaceutically acceptable acid addition salts.

11. N-(β-guanidinoethyl)-2-azaspiro-[4.5]-decane and its pharmaceutically acceptable acid addition salts.

12. N-(β-guanidinoethyl)-3-azaspiro-[5.5]-decane and its pharmaceutically acceptable acid addition salts.

13. N-(β-guanidinoethyl)-6-azaspiro-[3.4] - octane and its pharmaceutically acceptable acid addition salts.

References Cited

UNITED STATES PATENTS 3,078,272  2/1963  Mull _____ 260—293
3,106,552  10/1963  Grogan _____ 260—293
3,189,601  6/1965  Mull _____ 260—326.86
3,200,118  8/1965  Grogan _____ 260—293

WALTER A. MODANCE, *Primary Examiner.*

JOHN D. RANDOLPH, *Examiner.*

AVROM D. SPEVACK, *Assistant Examiner.*